(12) United States Patent
Trapani et al.

(10) Patent No.: US 7,251,075 B2
(45) Date of Patent: *Jul. 31, 2007

(54) POLARIZERS COATED WITH OPTICALLY FUNCTIONAL LAYERS

(75) Inventors: Giorgio Trapani, Cambridge, MA (US); William K. Smyth, Sudbury, MA (US); Pradnya V. Nagarkar, Newton, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,672

(22) Filed: Sep. 18, 2006

(65) Prior Publication Data

US 2007/0013818 A1  Jan. 18, 2007

Related U.S. Application Data

(63) Continuation of application No. 09/897,865, filed on Jul. 2, 2001, now Pat. No. 7,110,178.

(51) Int. Cl.
*G02B 27/28* (2006.01)
*G02B 5/30* (2006.01)

(52) U.S. Cl. .................. 359/492; 359/490
(58) Field of Classification Search ......... 359/490, 359/492, 502, 485; 349/96
See application file for complete search history.

(56) References Cited

U.S. PATENT DOCUMENTS

| | | | |
|---|---|---|---|
| 2,397,231 A | 3/1946 | Barnes | |
| 2,445,555 A | 7/1948 | Binda | |
| 4,123,141 A | 10/1978 | Schuler | |
| 4,293,585 A * | 10/1981 | Imada et al. | 427/536 |
| 4,747,674 A | 5/1988 | Butterfield et al. | |
| 4,818,624 A * | 4/1989 | Downey, Jr. | 428/447 |
| 5,015,072 A | 5/1991 | Howell | |
| 5,066,108 A | 11/1991 | McDonald | |
| 5,666,223 A * | 9/1997 | Bennett et al. | 359/490 |
| 5,742,430 A | 4/1998 | Cronin | |
| 5,886,799 A | 3/1999 | Molteni et al. | |
| 5,895,106 A | 4/1999 | VanderPloeg et al. | |
| 5,926,293 A | 7/1999 | Ralli | |

(Continued)

FOREIGN PATENT DOCUMENTS

GB   2 267 774   12/1993

(Continued)

OTHER PUBLICATIONS

Cael, et al., High Durability DE Polarizers for LCD Application, Polarizers Corporation pp. 1-5, copyright 1995, document date Jul. 26, 2000.

*Primary Examiner*—Leonidas Boutsikaris
(74) *Attorney, Agent, or Firm*—George W. Jonas

(57) ABSTRACT

An optical stack includes an intrinsic polarizer, such as a K-type or thin KE polarizer sheet. Optically functional coatings are disposed on one or both of the surfaces of the intrinsic polarizer. The optically functional coatings include a hardcoat, a transflector coating, a reflector coating, an antireflection film, a liquid crystal polymer retarder coating, a diffusion coating, an antiglare film, a wide view film, and an electrode. An optical stack including an intrinsic polarizer and an optically functional coating may have a thickness of less than 25 microns.

5 Claims, 3 Drawing Sheets

U.S. PATENT DOCUMENTS

| | | |
|---|---|---|
| 5,973,834 A | 10/1999 | Kabada et al. |
| 6,025,897 A | 2/2000 | Weber et al. |
| 6,330,108 B1 | 12/2001 | Nishikouji et al. |
| 6,337,369 B1 * | 1/2002 | Isozaki ................. 525/61 |
| 6,433,846 B1 | 8/2002 | Omar et al. |
| 6,535,337 B1 | 3/2003 | Tanaka et al. |
| 6,549,335 B1 | 4/2003 | Trapani et al. |
| 6,630,970 B2 | 10/2003 | Trapani et al. |
| 6,683,717 B1 * | 1/2004 | Miyatake et al. ........... 359/490 |
| 6,800,378 B2 | 10/2004 | Hawa et al. |
| 6,949,207 B2 * | 9/2005 | Jones et al. ................. 252/585 |
| 2003/0184862 A1 | 10/2003 | Sahouani et al. |

FOREIGN PATENT DOCUMENTS

| | | |
|---|---|---|
| JP | 2000258772 | 9/2000 |
| JP | 1194653 A | 7/2001 |
| WO | WO 97/21123 | 6/1997 |
| WO | WO 00/41030 | 7/2000 |
| WO | WO 01/57841 | 8/2001 |

* cited by examiner

POLARIZERS COATED WITH OPTICALLY FUNCTIONAL LAYERS

CROSS REFERENCE TO RELATED APPLICATIONS

This is a continuation application of prior application Ser. No. 09/897,865, filed on Jul. 2, 2001, now U.S. Pat. No. 7,110,178, the contents of which is incorporated by reference in its entirety herein.

BACKGROUND

This invention relates to polarizers such as those used in liquid crystal displays, and more particularly to polarizers coated with optically functional layers.

Liquid crystal displays are optical displays used in devices such as laptop computers, hand-held calculators and digital watches. A typical liquid crystal display includes a liquid crystal display cell and an electrode matrix disposed between a pair of absorbing polarizers. The liquid crystal display cell contains, e.g., twisted nematic or super twisted nematic molecules. In the liquid crystal display, the optical state of portions of the liquid crystal display cell is altered by the application of an electric field using the electrode matrix. This creates an optical contrast for light passing through the liquid crystal display cell that results in the appearance of pixels of polarized light on the liquid crystal display.

A typical liquid crystal display includes a front polarizer and a rear polarizer. These polarizers may be plane polarizers that absorb light of one polarization orientation more strongly than they absorb light of the orthogonal polarization orientation. The transmission axis of the front polarizer is usually crossed with the transmission axis of the rear polarizer in a liquid crystal display. The angle by which these transmission axes are crossed can vary from zero degrees to ninety degrees.

In general, unpolarized ambient light waves vibrate in a large number of directions without having a single characterizing electromagnetic radiation vector. By contrast, plane polarized light consists of light waves having a direction of vibration along a single electromagnetic radiation vector. Also, circularly polarized light has a direction of vibration along an electromagnetic radiation vector that rotates as the light propagates through space. Polarized light has many applications in electro-optical devices, such as the use of plane and circular polarizing filters to reduce glare in displays.

Further, much commercial attention has been directed to the development and improvement of flat panel displays, particularly thin, compact flat panel displays. A problem encountered in the construction of plastic flat panel displays is the development of "black spots," which arise from the formation of bubbles in the liquid crystal material from gas that has permeated through the plastic display materials. Another problem associated with plastic flat panel displays is moisture contamination of the liquid crystal display cell. These problems are avoided in conventional liquid crystal displays by using low permeability glass substrates instead of plastic. With respect to plastic flat panel displays, these problems are addressed by adding additional gas and moisture barrier layers to the liquid crystal display structure and/or the plastic substrates. However, adding such gas and moisture barrier layers increases the thickness, weight and cost of the displays.

Polarizers in the form of synthetic polarizing films exhibit comparative ease of manufacture and handling and comparative ease with which they may be incorporated into electro-optical devices such as flat panel displays. In general, plane polarizing films have the property of selectively passing radiation vibrating along a given electromagnetic radiation vector and absorbing electromagnetic radiation vibrating along a second electromagnetic radiation vector based on the anisotropic character of the transmitting film medium. Plane polarizing films include dichroic polarizers, which are absorbing plane polarizers utilizing the vectorial anisotropy of their absorption of incident light waves. The term "dichroism" refers to the property of differential absorption of the components of incident light, depending on the vibration directions of the component light waves. Light entering a dichroic plane polarizing film encounters two different absorption coefficients along transverse planes, one coefficient being high and the other coefficient being low. Light emerging from a dichroic film vibrates predominantly in the plane characterized by the low absorption coefficient.

Dichroic plane polarizing films include H-type (iodine) polarizers and dyestuff polarizers. For example, an H-type polarizer is a synthetic dichroic sheet polarizer including a polyvinyl alcohol-iodine complex. Such a chemical complex is referred to as a chromophore. The base material of an H-type polarizer is a water-soluble high molecular weight substance, and the resulting film has relatively low moisture and heat resistance and tends to curl, peel or otherwise warp when exposed to ambient atmospheric conditions. Further, H-type polarizers are inherently unstable, and require protective cladding, e.g., layers of cellulose triacetate, on both sides of the polarizer to prevent degradation of the polarizer in a normal working environment such as in a liquid crystal display.

In contrast to H-type polarizers and other similar synthetic dichroic plane polarizers are intrinsic polarizers and thinly cladded or encapsulated polarizers. Intrinsic polarizers polarize light due to the inherent chemical structure of the base material used to form the polarizer. Such intrinsic polarizers are also typically thin and durable. Examples of intrinsic polarizers are K-type polarizers. A thinly cladded or encapsulated polarizer may be, e.g., an iodine polarizer coated on both surfaces with polymer coatings each having a thickness of only about 5 microns, and is also thin and durable.

A K-type polarizer is a synthetic dichroic plane polarizer based on molecularly oriented polyvinyl alcohol (PVA) sheets or films with a balanced concentration of light-absorbing chromophores. A K-type polarizer derives its dichroism from the light absorbing properties of its matrix, not from the light-absorbing properties of dye additives, stains, or suspended crystalline materials. Thus, a K-type polarizer may have both good polarizing efficiency and good heat and moisture resistance. A K-type polarizer may also be very neutral with respect to color.

An improved K-type polarizer, referred to as a KE polarizer, is manufactured by 3M Company, Norwood, Mass. The KE polarizer has improved polarizer stability under severe environmental conditions, such as high temperatures and high humidity. In contrast to H-type polarizers, in which the light absorption properties are due to the formation of a chromophore between PVA and tri-iodide ion, KE polarizers are made by chemically reacting the PVA by an acid catalyzed, thermal dehydration reaction. The resulting chromophore, referred to as polyvinylene, and the resulting polymer may be referred to as a block copolymer of vinylalcohol and vinylene.

For H-type polarizers, stability is achieved by sandwiching the polarizer between two plastic substrates, such as two layers of cellulose triacetate, one on each side of the polarizer. However, even in these structures the application of heat, humidity and/or vacuum can adversely affect the properties of the polarizer. By contrast, K-type polarizers such as KE polarizers do not need to be sandwiched between sheets of cellulose triacetate. The polyvinylene chromophore of the KE polarizer is an extremely stable chemical entity, since the chromophore is intrinsic to the polymer molecule. This chromophore is thermally stable as well as resistant to attack from a wide range of solvents and chemicals.

A K-type polarizer such as a KE polarizer has several advantages over other types of polarizers, e.g., iodine and dyestuff polarizers. K-type polarizers have more durable chromophores, are thinner, and may be designed with variable transmission levels. Most notably, K-type polarizers such as KE polarizers may be used in applications that require high performance under severe environmental conditions, including high temperatures and high humidity, such as 85° C. and 85% relative humidity, for extended periods of time. Under such extreme environmental conditions, the stability of iodine polarizers is greatly reduced, thus limiting their usefulness in applications such as flat panel displays. Due to the inherent chemical stability of K-type polarizers, a wide variety of adhesive formulations, including pressure sensitive adhesives, can be applied directly to K-type polarizers. Further, a single-sided plastic support is adequate to give physical support for K-type polarizers, and since this support can be located outside of the optical path of the liquid crystal display cell, it need not be optically isotropic and lower-cost substrates such as polyethylene terephthalate (PET) are acceptable alternatives. Moreover, the ability to construct single-sided laminates allows the optical structures to be thinner, allowing for additional flexibility in the design and manufacture of flat panel display elements. These advantages of K-type polarizers may be used in a wide variety of optical applications, including flat panel displays.

In contrast to a plane polarizer, a circular polarizer may be constructed of a plane polarizer and a quarter-wavelength retarder. A quarter-wavelength retarder shifts the phase of light waves propagating along one plane through the retarder by one-quarter wavelength, but does not shift the phase of light waves propagating through the retarder along a transverse plane. The result of combining light waves that are one-quarter wavelength out of phase and that vibrate along perpendicular planes is circularly polarized light, for which the electromagnetic radiation vector rotates as the combined light waves travel through space.

Circularly polarized light may be described with respect to two distinct polarization states: left-handed (L) and right-handed (R) circularly polarized light. A circular polarizer absorbs light of one of these polarization states and transmits light of the other polarization state. The use of circular polarizers to reduce glare in displays is well known. In particular, light from an emissive display can be selectively transmitted through a circular polarizer, while background ambient light reflected in the display, which causes glare, may be reduced or eliminated.

A conventional liquid crystal display stack 100 is shown in FIG. 1. A liquid crystal display cell 102 has two surfaces coated with layers 104, 106 of an adhesive, e.g., a pressure sensitive adhesive, to secure polarizer structures to both surfaces of the liquid crystal display cell. The polarizer structures each include plane polarizers 108, 110, e.g., H-type polarizers, which have layers 112, 114, 116, 118 of cellulose triacetate as a protective cladding on both surfaces thereof. The layers of cellulose triacetate may be secured to the polarizers with layers of adhesive 120, 122, 124, 126. Liquid crystal display stack 100 also typically includes a transflector or reflector 30 attached to the back side of the display by an adhesive layer 32, e.g., a pressure sensitive adhesive, the transflector or reflector functioning to enhance the brightness and contrast of the liquid crystal display. H-type polarizers 108, 110 each typically have a thickness of approximately 20 microns, each of the layers of cellulose triacetate is typically approximately 80 microns thick, the pressure sensitive adhesive layers typically have a thickness of approximately 25 microns each, and the other adhesive layers typically have a thickness of approximately 5 microns each. Liquid crystal display stack 100 has a thickness of at least about 455 microns, excluding the liquid crystal display cell and the transflector.

Layers of adhesives, e.g., pressure sensitive adhesives, have previously been applied to intrinsic polarizers such as KE polarizer sheets. An adhesive layer may be used to adhere the polarizer to a liquid crystal display cell or to another optically functional layer, which may itself be formed on a substrate such as polyethylene terephthalate (PET). Typically, the thickness of a polarizer such as a KE polarizer sheet is about 20 microns, and the thickness of the adhesive layer is about 25 microns.

SUMMARY

In general, in one aspect, the invention features an optical stack including an intrinsic polarizer having a first surface. A first optically functional coating is disposed on the first surface of the intrinsic polarizer.

Implementations of the invention may also include one or more of the following features. The intrinsic polarizer may have a second surface, and the optical stack may also include a second optically functional coating disposed on the second surface of the intrinsic polarizer. The intrinsic polarizer may be a K-type polarizer or a KE polarizer sheet.

The first optically functional coating may include a hardcoat, a reflector coating, a liquid crystal polymer retarder coating, a diffusion coating, an antiglare film, a wide view film, or an electrode. The first optically functional coating may include a transflector coating, which may include a layer of metal. The first optically functional coating may include an antireflection film, which may include a plurality of polymer layers or inorganic layers.

The intrinsic polarizer may have a second surface, and the optical stack may also include a layer of adhesive disposed on the second surface of the intrinsic polarizer. The intrinsic polarizer may be attached to a liquid crystal display cell by the layer of adhesive. The layer of adhesive may include a pressure sensitive adhesive or a diffuse adhesive.

In general, in another aspect, the invention features an optical stack including an intrinsic polarizer and an optically functional coating, wherein the thickness of the optical stack is less than 25 microns. In general, in another aspect, the invention features an optical stack including an intrinsic polarizer and an optically functional coating, wherein the thickness of the optical stack is about 25 microns.

In general, in another aspect, the invention features an optical stack, including a K-type polarizer having a first surface and a second surface. A first optically functional coating is disposed on the first surface of the K-type polarizer. A second optically functional coating is disposed on the second surface of the K-type polarizer.

In general, in another aspect, the invention features a method of forming an optical stack. An intrinsic polarizer having a first surface and a second surface is provided. A first optically functional coating is disposed on the first surface of the intrinsic polarizer.

Implementations of the invention may also include one or more of the following features. The method may include disposing a second optically functional coating on the second surface of the intrinsic polarizer. The disposing step may include coating. The method may include disposing a layer of adhesive on the second surface of the intrinsic polarizer.

In general, in another aspect, the invention features an optical stack including a thinly cladded polarizer having a first surface. A first optically functional coating is disposed on the first surface of the thinly cladded polarizer.

In general, in another aspect, the invention features a method of forming an optical stack. A thinly cladded polarizer having a first surface is provided. A first optically functional coating is disposed on the first surface of the thinly cladded polarizer.

An advantage of the present invention is elimination of the need for protective cladding and support structures for the polarizers in the liquid crystal display stack, resulting in significant reduction in the thickness of the liquid crystal display. Thus, an additional advantage of the invention is the ability to manufacture thinner and lighter-weight liquid crystal displays. Another advantage of the present invention is that an intrinsic polarizer such as a K-type polarizer provides stable performance over a wide range of transmission levels. A further advantage of the present invention is increased brightness of liquid crystal displays using K-type polarizers compared to currently manufactured liquid crystal displays, with resulting lower energy requirements for illumination of the display.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference symbols in the various drawings indicate like elements.

DETAILED DESCRIPTION

The present invention relates to polarizers coated with optically functional layers, which may be used in liquid crystal displays.

Figure 1:
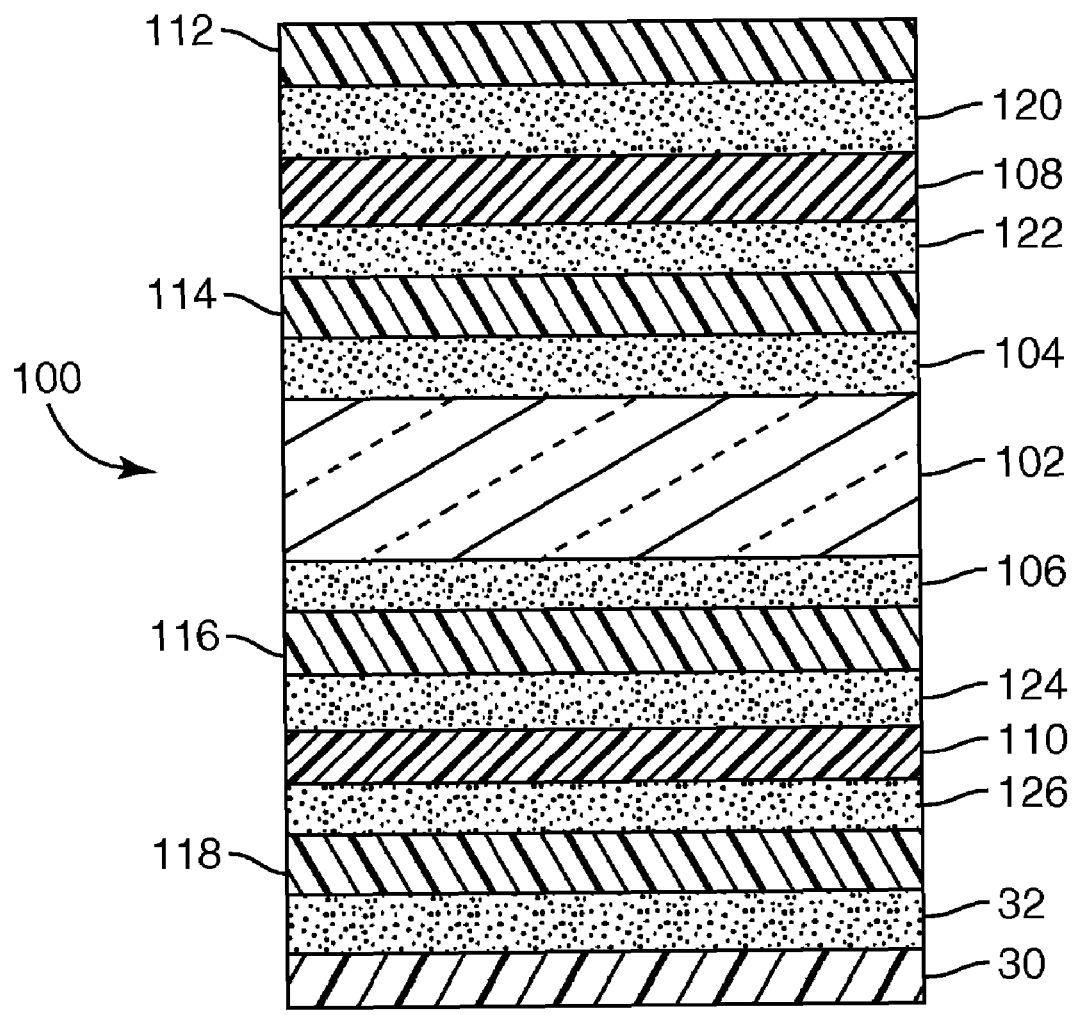
FIG. 1 is a cross sectional view of a conventional liquid crystal display stack.
Figure 2:
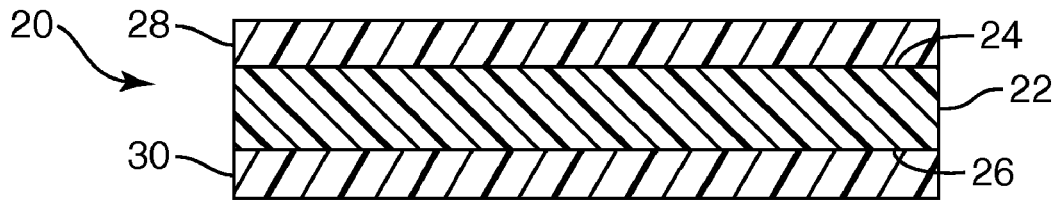
FIG. 2 is a cross sectional view of a polarizer with optically functional coatings according to the present invention.

FIG. 2 shows an optical stack 20, which includes a polarizer 22 having a first surface 24 and a second surface 26. Optically functional layers 28, 30 are coated directly onto the first and second surfaces of polarizer 22, respectively. In a particular application, only one of optically functional layers 28, 30 need be present on one of the surfaces of polarizer 22.

Polarizer 22 is preferably an intrinsic polarizer, such as a K-type polarizer or thin KE polarizer sheet. The intrinsic polarizer may be, e.g., a KE polarizer such as a sheet of the type manufactured by 3M Company, Norwood, Mass. A KE polarizer sheet may have a thickness of approximately 20 microns.

Optically functional layers 28, 30 may be coated directly onto an intrinsic polarizer 22, such as a K-type polarizer, due to the mechanical and chemical durability of the polarizer, and without requiring the use of an additional substrate such as polyethylene terephthalate (PET). Using a K-type polarizer in a liquid crystal display stack also eliminates the need for additional protective cladding of the polarizers. The cladding used for other types of polarizers, e.g., H-type polarizers, is generally a layer of cellulose triacetate disposed on both sides of the polarizer. Removing the cladding layers of cellulose triacetate results in a significant reduction in the thickness of the liquid crystal display stack.

Further, the use of K-type polarizers in liquid crystal display stacks could provide an effective gas and moisture permeability barrier to the liquid crystal material in the liquid crystal display cell. Thus, no additional barrier layers or cladding may be needed in a liquid crystal display structure constructed with a K-type polarizer disposed on each side of the liquid crystal display cell to achieve desired permeability specifications. In particular, a standard for moisture vapor transmission rate (MVTR), ASTM F1249, is less than 20 gm/m$^2$/day, and the oxygen transmission rate (O2GTR), ASTM D3985, is less than 1 ml/m$^2$/day. Structures for liquid crystal displays formed using KE polarizers, including PET support structures, have been shown to have a MVTR of 4.6 or less gm/m2/day and an O2GTR of less than 0.005 ml/m$^2$/day (tested at 20° C. and 90% relative humidity).

Figure 8:
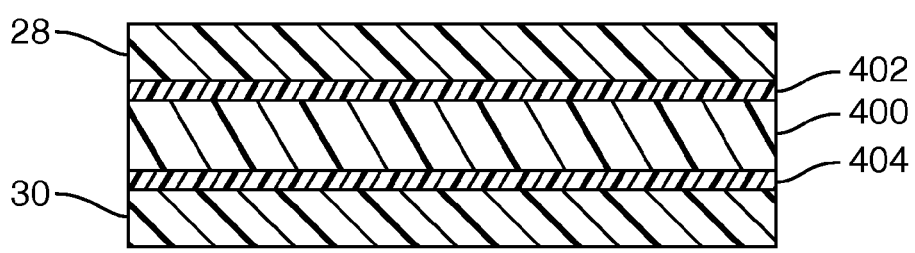
FIG. 8 is a cross sectional view of an alternative embodiment of a polarizer with optically functional coatings according to the present invention.

FIG. 8 shows an alternative embodiment of the invention, in which polarizer 22 is a thinly cladded or encased iodine polarizer. The thinly cladded polarizer includes an iodine polarizer sheet 400 coated on both surfaces with polymer coatings 402, 404 each having a thickness of about 5 microns. Optically functional layers 28, 30 are coated directly onto polymer coatings 402, 404. The thinly cladded polarizer is thin and durable, similar to an intrinsic polarizer such as a K-type polarizer.

Figure 3:
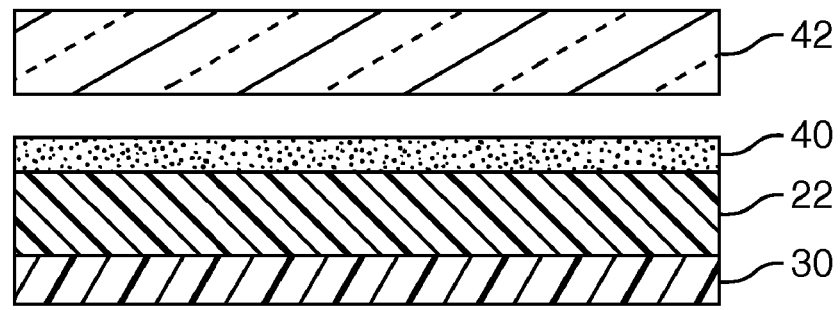
FIG. 3 is a cross sectional view of a polarizer with an adhesive layer and an optically functional coating according to the present invention.

FIG. 3 shows a layer of an adhesive 40, e.g., a pressure sensitive adhesive such as Kayapolar, coated onto one of the surfaces of polarizer 22. Adhesive layer 40 may be used to secure polarizer 22 to a liquid crystal display cell 42. An adhesive other than a pressure sensitive adhesive, e.g., a coated, urethane-based adhesive that is thermally cured such as a copolyester adhesive that is crosslinked using multifunctional isocyanates, may be used. An optically functional coating 30 may also coated onto the other surface of polarizer 22.

Each of optically functional layers 28, 30 may be, e.g, a hardcoat, a transflector coating, a reflector coating, an antireflection film, a liquid crystal polymer retarder coating, a diffusion coating, an antiglare film, a wide view film, or an electrode.

A hardcoat, which typically has a thickness of 1-6 microns, may be made, e.g., from an acrylate such as poly methyl methacrylate. The hardcoat may be either matte or clear. Alternatively, the hardcoat may be textured, e.g., by microreplication, to include beam steering properties or a matte appearance.

Referring to FIG. 2, a transflector coating or a reflector coating 30 may be disposed on the surface of intrinsic polarizer 22 facing the back side of the liquid crystal display to enhance the brightness and contrast of the liquid crystal display. A transflective coating may have a thickness of approximately 5-20 microns. The transflective coating may be, e.g., a nacreous pigment such as commercially available STR400 from Nippon Paper or a transflector material available from Teijin. Alternatively, a transflector or reflector coating may be in the form of a layer of metal such as silver or aluminum, which acts as a polarized mirror to reflect polarized light and enhance the brightness of the liquid crystal display. Such a transflector or reflector coating may be formed by sputtering, vacuum depositing, or otherwise coating a layer of silver or aluminum onto a K-type polarizer. Another example of a transflector is a coating of mica on a polymer or adhesive matrix.

Figure 4:
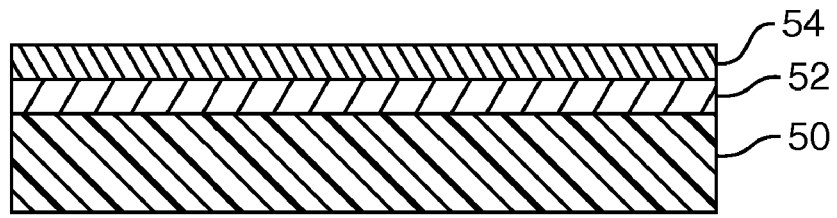
FIG. 4 is a cross sectional view of a polarizer with an antireflection coating according to the present invention.

An antireflection coating, which may have a thickness of less than 1 micron, may be made from a low index of refraction thermopolymer such as Kynar 1702. For example, as shown in FIG. 4, an antireflection coating formed on a KE polarizer sheet 50 has a high-refractive index hardcoat 52 and a low-refractive index antireflection layer 54. The hardcoat preferably has a refractive index greater than about 1.6, and a thickness of approximately 5-10 microns. The antireflection layer preferably has a refractive index less than about 1.5, and a thickness on the order of 0.1 micron, which corresponds to about one-quarter of the wavelength of visible light. Since a KE polarizer sheet has a thickness of about 20 microns, the total thickness of the optical stack shown in FIG. 4 may be less than 26 microns.

Figure 5:
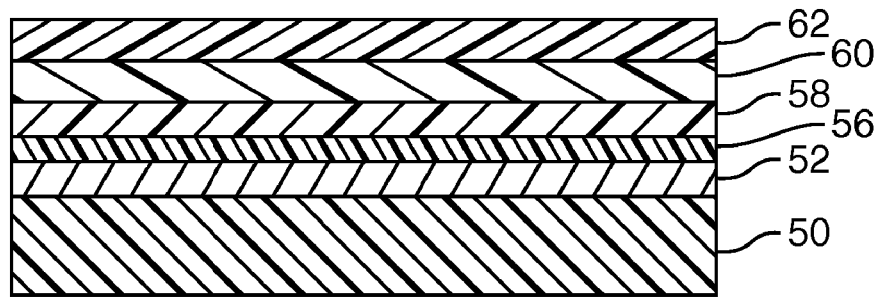
FIG. 5 is a cross sectional view of an alternative embodiment of a polarizer with an antireflective coating.

An antireflection coating may also have one or more antireflection layers, with the layers preferably having alternating high and low indices of refraction, because the optical performance of an antireflection film increases with the number of layers. Such a multilayer antireflection film preferably has a series of highly uniform polymer or inorganic layers formed by web coating, sputtering, or both. Thus, as shown in FIG. 5, a coating having, e.g., four polymer and or inorganic layers 56, 58, 60, 62, may be formed on hardcoat 52. The thicknesses of the polymer or inorganic layers also preferably increase with the distance from the hardcoat. Nevertheless, the total thickness of the multiple polymer or inorganic layers may be on the order of 0.1 micron, so that the total thickness of the optical stack shown in FIG. 5 may also be less than 26 microns.

A liquid crystal polymer coating, which typically has a thickness of up to approximately 100 microns, may function as a retarder or negative dispersion compensation film to enhance the color and contrast of a liquid crystal display by changing the phase of light passing through the retarder. Such a retarder is preferably a thin film, broadband quarter-wavelength retarder or negative dispersion compensation film effective over all or a substantial portion of the visible electromagnetic spectrum, such as the broadband quarter-wavelength retarders manufactured by Teijin. For example, the typical thickness of quarter-wavelength retarder is approximately 30-60 microns. Alternatively, the retarder or negative dispersion compensation film may be a polycarbonate based retarder or an Arton-type resin retarder.

Figure 6:
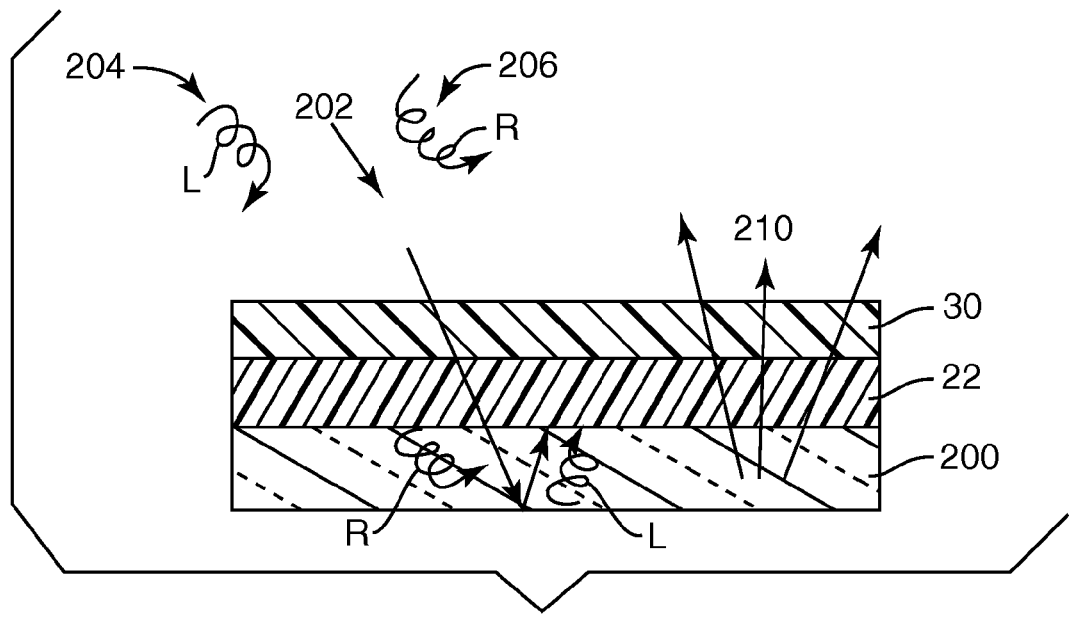
FIG. 6 is a cross sectional view of a polarizer with a retarder according to the present invention.

The combination of an intrinsic polarizer with a retarder acts as a circular polarizer, which significantly reduces the intensity of undesirable reflected ambient light, thereby increasing the contrast of the image formed by the emitted signal from the display. As shown in FIG. 6, unpolarized ambient light 202 may be represented as a combination of left-handed (L) 204 and right-handed (R) 206 circularly polarized light components. When unpolarized ambient light 202 enters liquid crystal display 200, one circularly polarized component of the ambient light, e.g., left-handed circular polarized light 204, is absorbed by the combination of the intrinsic polarizer 22 and the retarder 30, while the other component, the right-handed circularly polarized light 206, is transmitted through the liquid crystal display. The transmitted right-handed circularly polarized light 206 is specularly reflected in the liquid crystal display. However, the handedness of circularly polarized light is reversed upon specular reflection, and the transmitted right-handed circularly polarized light 206 becomes left-handed circularly polarized light. The reflected left-handed circularly polarized light is reflected toward the combination of the intrinsic polarizer with the retarder, where it is absorbed in the same manner as the left-handed circularly polarized component 204 of ambient light 202. Thus, both the left-handed and right-handed circularly polarized components of the ambient light are absorbed by the combination of the intrinsic polarizer and the retarder, which acts as a circular polarizer, during transmission through and reflection in liquid crystal display 200 so that they do not interfere with an emitted light signal 210.

A diffusion coating may be a diffuse adhesive that functions similarly to the combination of an adhesive layer and a transflective coating to increase the viewing angle of the liquid crystal display. For example, a diffuse adhesive may be a pressure sensitive adhesive to which glass beads have been added to scatter light passing through the adhesive. Such a diffuse adhesive typically has a thickness of approximately 12-40 microns. Alternatively, a diffusion layer may be a polymer film or a polymer matrix containing glass beads.

An antiglare film may be used to reduce the specular component of reflection from a display surface, e.g., using a roughened surface. Such an antiglare film may be made from an ultraviolet crosslinked polymer or an acrylate doped with poly methyl methacrylate or silica beads or particles. An antiglare film may have a thickness, e.g., from about 1 to about 12 microns.

A wide view film may be used to expand the viewing angle to a display surface. Such a wide view film typically has several layers of oriented liquid crystal polymers, i.e., with the molecules in a first layer orienting the molecules in an adjacent second layer.

Optically functional coatings 28, 30 may be applied to polarizer 22 by one or more standard coating methods. Applicable coating methods include, but are not limited to, spin coating, sputtering, rod coating, gravure coating, slot dye coating, vacuum coating, knife coating, and dip coating.

Figure 7:
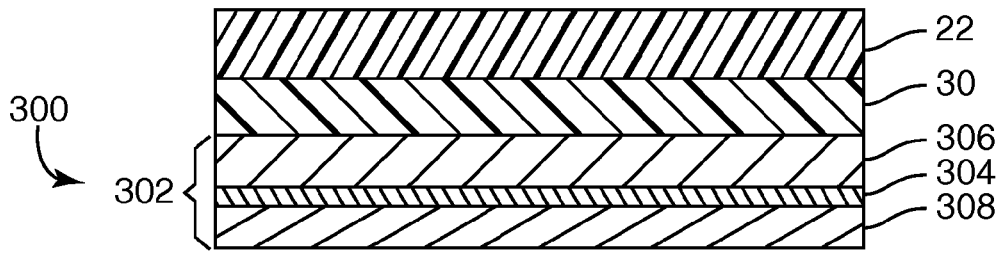
FIG. 7 is a cross sectional view of a polarizer with a conductor according to the present invention.

FIG. 7 shows another embodiment of the present invention, in which an intrinsic polarizer such as a K-type or thin KE polarizer sheet is used as a substrate for a conductor in a liquid crystal display without requiring any adhesive for attaching the conductor. In polarizer structure 300, a conductor 302 in the form of a conducting metal or metal oxide layer 304, e.g., indium tin oxide (ITO), is disposed between layers 306, 308, e.g., also of ITO. Layer 304 may be, e.g., silver, gold, or a mixture of silver and gold. Conductor 302 is formed on a hardcoat 30 directly on intrinsic polarizer 22. A conductor pattern may then be etched into layers 304, 306, 308 of conductor 302.

A number of embodiments of the invention have been described. Nevertheless, it will be understood that various modifications may be made without departing from the spirit and scope of the invention. Accordingly, other embodiments are within the scope of the following claims.

What is claimed is:

1. An optical stack, comprising:
   an intrinsic polarizer having a first surface and a second surface;
   an optically functional layer secured to the first surface; and
   wherein the intrinsic polarizer is not directly protected or supported in the optical stack.

2. The optical stack of claim 1 wherein the optically functional layer is effective over the visible electromagnetic spectrum.

3. The optical stack of claim 1 wherein the optically functional layer is effective over the non-visible electromagnetic spectrum.

4. The optical stack of claim 1 wherein the optical stack does not include cellulose triacetate.

5. The optical stack of claims 2 or 3 and further comprising:
   a layer of adhesive disposed on the second surface of the intrinsic polarizer.

* * * * *